United States Patent Office 3,720,739
Patented Mar. 13, 1973

3,720,739
NUCLEAR FUEL PRESSING PROCESS
Laird T. Hagie, Fremont, and Chester M. Ryer, San Jose, Calif., assignors to General Electric Company
Continuation-in-part of abandoned application Ser. No. 690,248, Dec. 13, 1967. This application Apr. 14, 1969, Ser. No. 815,615
Int. Cl. G21c 21/00
U.S. Cl. 264—.5
10 Claims

ABSTRACT OF THE DISCLOSURE

A pressing technique for producing nuclear fuel pellets for use in nuclear reactors is disclosed. Typically, an active nuclear fuel material is pressed at a pressure of from about 6000 to about 10,000 p.s.i. and a temperature from about 900 to about 1300° C. for about 3 to about 20 minutes. For good results, it is necessary that full pressure be applied before the temperature is increased to the temperature at which significant plastic flow begins in the fuel material.

CROSS-REFERENCE TO RELATED APPLICATIONS

This application is a continuation-in-part of copending U.S. patent application Ser. No. 690,248, now abandoned, filed Dec. 13, 1967.

BACKGROUND OF THE INVENTION

Nuclear steam generating plants, utilizing heat produced by nuclear fission reactions in a nuclear reactor, are now well known.

Several types of nuclear reactors utilize fuel elements of the rod type. Rod type fuel elements include a tubular member or "clad" of corrosion resistant material in which a plurality of fuel pellets or granules are placed. The ends of the tubular clad member are sealed with end plugs or caps. The individual fuel rods are secured in a fixed parallel array to form a fuel assembly. A plurality of these fuel assemblies are then mounted in the reactor core.

Generally, it is preferred that the tubular clad be filled with a series of dense fuel pellets which closely conform to the interior of the clad, to give the highest concentration of fuel in the rod.

These fuel pellets have generally been prepared by mixing the fuel material in finely divided form, cold pressing the material to form a green compact, and then sintering the compact to produce a hard, dense pellet. This process, however, has several disadvantages.

Sintering generally requires that the material be held at a temperature on the order of 3000° F. for, typically, three hours. In addition, where a paraffin-base binder is used in the green compact, a pre-sintering step may be required to remove the binder. Pre-sintering often requires that the compact be held at a temperature over 800° F. for over 30 minutes.

Typical tubular cladding may be over 10 feet long, with an internal diameter of less than 0.5 inch. Thus, it is ncessary that fuel pellets have consistent critical diameters to permit loading into the tubular clad, without an undesirably large space between the pellets and the tube walls. Fuel materials tend to deform during sintering and to require grinding to size. Grinding is a relatively slow and expensive process which is wasteful of fuel material. Since the fuel material is expensive and radioactive, the grinding dust must be carefully collected and reused. This sintered dust is not suitable for re-sintering and must be extensively treated before reuse.

Generally, density of over 90% of the maximum theoretical density in the fuel pellets is desired. However, different densities have been found to be optimum for different types of reactors. It is very difficult to adjust end product density with high accuracy in the sintering processes.

Attempts have been made to produce fuel pellets by hot-pressing techniques instead of sintering. These prior attempts have required temperatures above 1400° C. and pressures above 10,000 p.s.i. for periods in excess of 30 minutes. These conditions are impractical for a process which must produce hundreds of thousands of pellets as rapidly as possible. Also, these processes often produce pellets with poor surface finish and low or varied density. Such high temeperatures and pressures are expensive to maintain and require complex equipment such as very strong dies. The required pressing time is impractically slow.

Thus, there remains a need for improvements in nuclear reactor fuel preparation.

It is, therefore, an object of this invention to provide a nuclear reactor fuel preparation process overcoming the above-noted disadvantages.

Another object of this invention is to provide a fuel pellet preparation process capable of producing pellets of uniform density and dimensions.

Another object of this invention is to provide a rapid process for the preparation of fuel pellets at moderate pressures and temperatures.

The above objects, and others, are accomplished in accordance with this invention by providing a fuel pellet pressing process in which powdered fuel material is pressed in a die at a temperature of from about 900 to 1300° C. and a pressure of from about 6000 to about 10,000 p.s.i.g. for a period of from about 3 to about 20 minutes.

It has been found that using conditions within these ranges reproducible pellet densities from about 70 to about 95% of theoretical density within ±1% and pellet diameters consistently within ±0.0005 inch may be obtained. Total cycle time, even with manual handling of the material between steps, has been found to range from about 14 to about 31 minutes.

In order to produce pellets of uniform density and good surface finish, it has been found necessary that full pressure be applied to crush a preform pellet or compress a powdered or granular mold charge before the temperature is raised above the temperature at which significant plastic flow begins. The preferred temperature range of from about 900 to about 1300° C. causes the particles to bond or sinter into a high density pellet. However, if the temperature is increased before the full pressure is applied, the pellets tend to have irregular surfaces and non-uniform density. Since with the usual presses and heating means the pressure is increased from zero much more rapidly than is the temperature, usually the increase in pressure and temperature can be initiated substantially simultaneously, since full pressure will usually be reached well before the temperature reaches the point at which significant plastic flow begins in the fuel material. In any case, care should be exercised that such flow does not begin before full pressure is applied.

This process is especially useful in the production of pellets having unusual cross-sectional configurations, such as those shown in U.S. Pats. 3,262,860 and 3,043,761. For example, pellets having a "star" shaped cross-section can be easily pressed by the process of this invention, while such a shape is very difficult to sinter and grind to shape. Also, pellets with "dished" ends may be produced by simply using punches with hemispherical or otherwise shaped ends. Such pellets are difficult to accurately produce by sintering and grinding processes.

Details of this invention may be further understood upon reference to the drawing, wherein.

Figure 1:
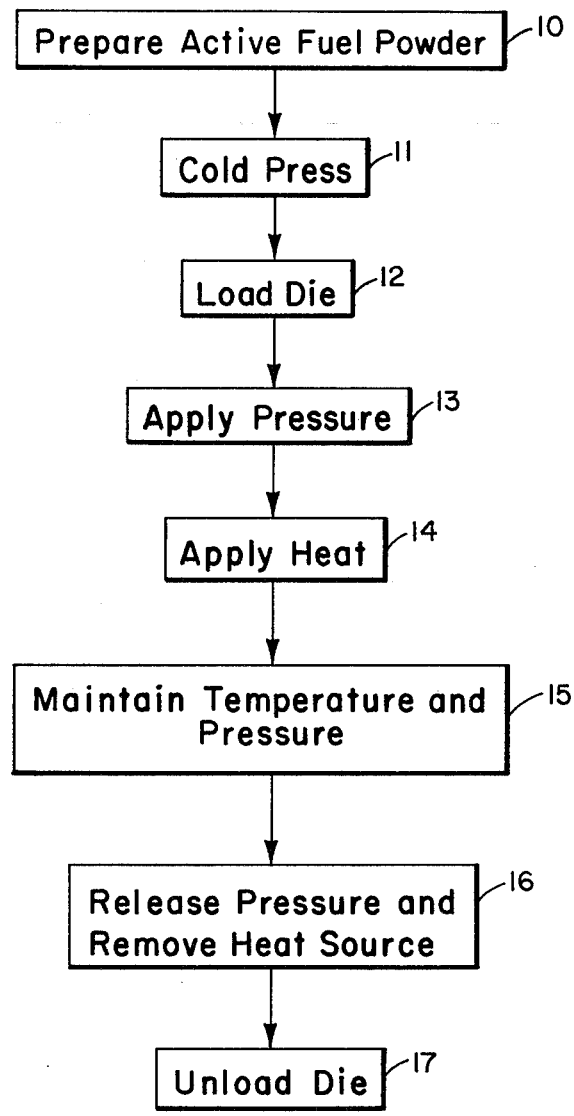
FIG. 1 shows a block diagram representing a preferred embodiment of the invention.

Referring now to FIG. 1, there is seen a block diagram indicating steps in a preferred embodiment of this invention.

The step of preparing the fuel powder to be pressed is indicated at 10. Any suitable nuclear fuel material may be used in this process. Typical materials include oxides of uranium and plutonium and mixtures thereof. An active powder may be prepared in any conventional manner, such as by precipitation from a nitrate solution with $NH_4OH$. The powder should have a very high surface area and a ratio of oxygen to metal atoms of greater than stoichiometric. For example, for $UO_2$ it is preferred that this ratio be at least 2.1 atoms of oxygen for each atom of uranium. Also, it is preferred that the particles have an average diameter of less than about 0.1 micron. It has been found that powders having these characteristics produce pellets of highly uniform density. The powder may include, if desired, small amounts of other isotopes, burnable poisons, etc.

It is preferred that this powder be pressed at room temperatures into a preform, as indicated at cold press step 11. The cold pressed preform aids in handling and in obtaining consistent results. The cold pressing is preferably carried out at about room temperature at a pressure of up to about 1000 p.s.i. It is necessary that the preform be relatively fragile, so that it will be crushed during the initial stages of hot pressing. This preform preferably has a density of about 30 to about 50% of theoretical density.

The preform, or the powder if the cold pressing step is eliminated, is then loaded into a die, as indicated at 12. The die may consist of any suitable material. Very strong, expensive dies are not required at the relatively moderate temperatures and pressure used in hot pressing according to this invention. Excellent results have been obtained with graphite dies, for example. It is preferred that the dies be cylindrical in cross-section so as to fit easily in an induction heating coil. Where there are a plurality of cavities in the die, they should be arranged in a circle, since other arrangements weaken the die and lead to uneven heating.

After the die is loaded, pressure is applied to the preform, as indicated at 13. While pressure could be applied as heating is started, it is preferred that the full process pressure be applied immediately. This insures compaction of powder or crushing and compaction of a preform before plastic flow can begin, as discussed above. Best overall results are obtained with pressures in the range of from about 6000 to about 10,000 p.s.i. Lower pressures tend to give pellets of lower densities, while higher pressures require a stronger die and greater power.

Heat is applied to the die as indicated at 14, either immediately after, or substantially simultaneously with, the applicatiion of pressures under controlled conidtions as described above. An induction coil surrounding the die is a convenient means for heating. Generally, about 3-7 minutes are desirable for heating the die to the process temperature. Slower heating is wasteful of time, while more rapid heating tends to cause broken pellets and to require excess power. As indicated above, good results are obtained with final temperatures of from about 900 to about 1300° C. Best overall results are obtained with temperatures in the range of from about 900 to about 1100° C. Substantially lower temperatures produce pellets of low density, while temperatures much above 1100° C. require more powerful equipment and use more power than is desirable.

After the temperature has reached the desired level, the temperature and pressure are maintained for the desired period, as indicated at 15. For optimum density and product uniformity, consistent with conservation of energy applied, the application of the temperature and pressure should be maintained for from about 5 to about 12 minutes, although, as indicated above, good results are obtained with a time of from about 3 to about 20 minutes.

At the end of this period, the pressure is released and the heat source removed as indicated at 16, such as by turning the induction coil "off." It is not necessary to cool the pellets before removal from the die, although it is ordinarily preferable to cool the pellets before removal.

The die is then unloaded, as indicated at 17. The die can then be reloaded and the above cycle repeated immediately. It is not necesary to cool the die to room temperature between cycles, although it must, of course, be cooled below the temperature at which plastic flow of the material could occur.

Thus, it can be seen that the hot pressing portion of the process shown in FIG. 1, namely steps 12 through 17, is capable of rapidly producing pellets of high quality. Pellets of a wide range of densities can be produced by this process. For the usual nuclear fuel uses, it is preferred that the pellets have a density of between about 85 and about 95% of the theoretical maximum density. Less dense pellets produced an undesirably low concentration of fissionable material in the reactor, while pellets having a density of over about 95% of theoretical tend to crack and chip when handled or heated.

Figure 2:
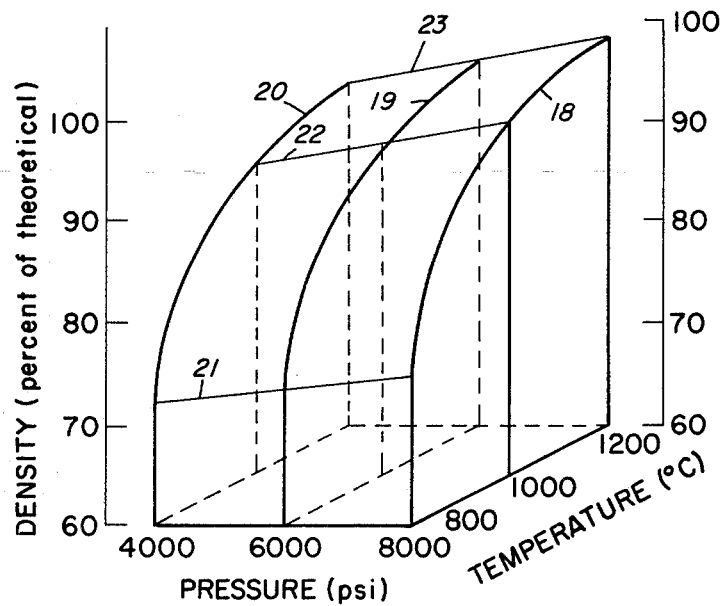
FIG. 2 shows in graphical form the relationship of pressure, temperature and density in the process of this invention.

FIG. 2 shows, in a three-dimensional graphical form, a comparison of pellet density dependence on temperature and pressure in the process of this invention. As can be seen from FIG. 2, density increases with increasing pressure and temperature. However, the effects on density due to temperature as indicated by curves 18, 19 and 20 are much greater than those due to pressure variations as indicated by lines 21, 22 and 23. Thus, any desired density within the range shown can be obtained by applying preselected temperature and pressure conditions.

Figure 3:
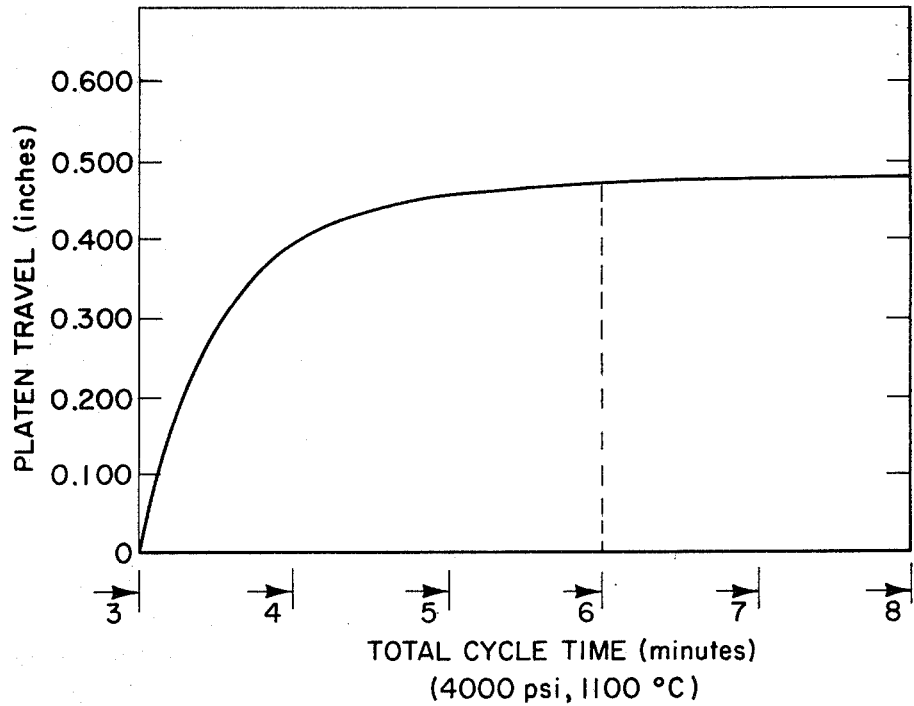
FIG. 3 shows a graph indicating density changes with time during the process of this invention.

FIG. 3 shows a curve of die platen travel plotted against pressing time. This curve is based on a pressure of about 4000 p.s.i. and a process temperature of about 1100° C. Since, as is pointed out above, pellet diameter is substantially constant with varying pressure and temperature, platen travel is a direct indication of pellet density. The zero point for platen travel was arbitrarily set at the platen portion three minutes after pressure application began, during heating of the die to the 1100° C. end temperature As can be seen from FIG. 3, the curve of platen travel (and, therefore, of pellet density) is asymptotic, substantially leveling off after about 6 minutes from the time the pressure was applied and heating began as indicated by dashed line 24. To continue pressure and heat application, for the given condition, after 6 minutes gives very little increase in density. Thus, it is preferred that for each set of process conditions, the time should be sufficient to reach this point, and that density variations should be produced by varying temperature or pressure, rather than pressing time.

EXAMPLE I

A powder containing about 2 wt. percent $PuO_2$ and about 98 wt. percent $UO_2$ is prepared as follows. Concentrated ammonium hydroxide is added to a nitrate solution containing 2% Pu and 98% U to coprecipitate ammonium diuranate and plutonium hydroxide. The precipitate is dried at about 300° C., then is broken into small agglomerates. The material is reduced in flowing 6% $H_2$–94% He for about 8 hours at about 750° C. The oxygen-to-metal atom ratio for this mixed oxide powder is about 2.157. The powder is milled in an alumina ball mill with ½ inch diameter steel balls for about 2 hours. The powder and balls are vibrated on a 65 mesh stainless steel Tyler screen. Powder which then passes through a 200-mesh screen is collected for pressing.

Several samples of about 6 grams each, weighed to the nearest 0.1 gram are prepared. Each sample is cold pressed in a 0.442 I.D. steel die at about 400 p.s.i. for about 45 seconds to produce a lightly bonded preform.

A series of these preforms are then hot pressed at various temperatures, times and pressures. Each pellet is pressed in a cylindrical graphite die having an inner diameter of about 0.453 inch, an outer diameter of about 1.75 inches and a length of about 3.5 inches. The die is made from Graph-i-tite Grade G graphite, available from Graphite Specialties Company, Sanborn, N.Y. Two graphite punches fitting in each end of the die aperture apply pressure onto the preform. Heat is supplied to the graphite die by a Tocco Model 2EG152, 15-kw., 450 kc. induction coil surrounding the die in a flowing argon atmosphere. Pressure is applied with a manually operated Model B Carver laboratory press with a stationary top platen. Temperatures are measured by sighting on the exterior surface of the die body with a micro-optical pyrometer corrected to read central pellet temperature as measured by a Chromel-Alumel thermocouple. In each case, the preform is placed in the die, the upper punch is inserted and the pressure is brought up to the predetermined pressure. The temperature is then brought up to the predetermined temperature. A constant time period, about 7 minutes, was used to bring the pellet from room to the required temperature. Pressure and temperature are both maintained for the desired period, then both are returned to ambient conditions rapidly.

After the pellets are pressed, the density, diameter and length of each pellet is measured. The results are tabulated in the table below.

TABLE

| Time | 800° C. | | | 1,000° C. | | | 1,200° C. | | |
|---|---|---|---|---|---|---|---|---|---|
| | 4,000 p.s.i. | 6,000 p.s.i. | 8,000 p.s.i. | 4,000 p.s.i. | 6,000 p.s.i. | 8,000 p.s.i. | 4,000 p.s.i. | 6,000 p.s.i. | 8,000 p.s.i. |
| 2 minutes: | | | | | | | | | |
| Density | 63.2 | | 71.3 | | | 90.7 | 91.6 | 93.1 | 96.4 |
| Diameter | 0.4511 | | 0.4517 | | | 0.4517 | 0.4501 | 0.4510 | 0.4517 |
| Length | 0.3243 | | 0.2910 | | | 0.2272 | 0.2275 | 0.2222 | 0.2151 |
| 5 minutes: | | | | | | | | | |
| Density | | 69.5 | | | 90.5 | | | | 96.7 |
| Diameter | | 0.4514 | | | 0.4505 | | | | 0.4519 |
| Length | | 0.2981 | | | 0.2298 | | | | 0.2130 |
| 8 minutes: | | | | | | | | | |
| Density | 72.1 | | 75.6 | | 93.0 | | 93.6 | | 97.1 |
| Diameter | 0.4509 | | 0.4520 | | 0.4514 | | 0.4501 | | 0.4521 |
| Length | 0.2880 | | 0.2761 | | 0.2229 | | 0.2217 | | 0.2130 |

NOTES:
Density=Percent, theoretical 100%=10.964 grams/cc. (98% $UO_2$, 2% $PuO_2$).
Diameter, length=Inches.
Time=Period between reaching design temperature and turning power off.

As can be seen from the table above, varying temperature and pressure causes a significant variation in pellet density and length. Surprisingly, pellet diameter remains substantially constant and independent of temperature and pressure. Temperature appears to have the greatest influence on pellet density. Densities of over 90% of theoretical are obtainable with temperatures of 1000° C. and 1200° C. at all test pressures and time periods.

Example II

A powder containing about 3 wt. percent $PuO_2$ and about 97 wt. percent $UO_2$ is prepared by physically mixing $PuO_2$ from burned metal with natural $UO_2$ obtained from Eldorado Mining and Refining, Ltd., Port Hope, Ontario, in an 8-quart Patterson-Kelley blender with an intensifier bar for about 20 minutes.

A plurality of samples weighing about 20.3±0.1 grams are prepared. Each sample is cold pressed in a steel die to a density of about 40% of theoretical. A graphite die having six openings is loaded with these fragile preforms. The pellets are then hot-pressed at a temperature of about 1100° C., and a pressure of about 6000 p.s.i. for about 6 minutes by the procedure described in Example I above. In this procedure, full pressure is applied before the die is heated. The pellets produced have a density over 90% of theoretical density and a diameter of about 0.002 inch less than the die cavity diameter.

Example III

An active $UO_2$ powder is prepared as described in U.S. Pat. No. 3,394,997. The resulting powder has an average diameter of less than about 0.1 micron and an oxygen to uranium atom ratio of over 2.

About 6 grams of this powder are placed in a cavity having a diameter of about 0.453 inch in a graphite die. Pressure of about 8000 p.s.i. is applied to the powder and then the temperature of the powder is raised to about 1000° C. over about 4 minutes. Pressure and temperature are maintained for about 5 additional minutes. Pressure is then released, the heat is turned off and the pellet is removed from the die. The pellet is found to have excellent physical characteristics, and to have a density over 90% of theoretical density.

Example IV

A plurality of fragile preform pellets is prepared by cold pressing as described in Example I. Different pellets are hot pressed using the technique described in Example I with the temperature increased to the predetermined level before, during, or after the attainment of the predetermined pressure.

Pellet A is placed in the die cavity and the induction heating coil is turned on. After about 5 minutes a temperature of about 1200° C. is reached. Then the press is activated and the pressure on the preform is increased to about 4500 p.s.i.g. After about 7 minutes, the induction coil is turned off and the pressure is released. After the temperature has dropped to substantially room temperature, the pellet is removed and examined. This pellet is found to be extremely fragile and to have severe surface cracks. It appears that centering had begun before pressure is applied resulting in a very poor compaction of the pellet.

Pellet B is placed in the die and the induction coil and press are activated together. Temperature is increased to about 810° C. over about 4 minutes while the pressure is very slowly brought up to about 6000 p.s.i.g. Thus, temperature rise and pressure application are completely simultaneous. After about 5 minutes, the induction coil and press are turned off and the pellet is allowed to cool. The pellet is then removed from the die and examined. This pellet is found to be poorly compacted with severe surface irregularity and granulation.

Pellet C is placed in the die and the temperature and pressure are rapidly and simultaneously increased to about 1005° C. and 4500 p.s.i.g. Temperature and pressure increase was carefully adjusted to occur completely simultaneously. Pressure and temperature are then released and the pellet returned to ambient temperatures. After removal, the pellet is found to have an irregular, granular surface.

Pellet D is placed in the die and temperature and pressure are slowly and simultaneously increased to about 1200° C. and about 4500 p.s.i.g. The pressure and temperature are maintained for about 3 minutes, then the temperature and pressure are released. After the pellet is removed from the die, it is found to have a substantially irregular, granular surface and low density.

Pellet E is placed in the die and temperature and pressure are slowly and simultaneously increased to about 1200° C. and about 6000 p.s.i.g. The temperature and pressure are maintained for about 3 minutes, then the induction coil and pressure are turned off. After the pellet had returned to substantially ambient conditions, it is removed from the die and evaluated. The pellet is found to have a very irregular and granular surface and has low density.

Pellet F is placed in the die. The press is then activated and the pressure is brought up to about 6000 p.s.i.g. Then the induction coil is turned on, and temperature is brought up to 1005° C. The pressure and temperature conditions are maintained for about 5 minutes, then the induction coil and press are deactivated. After the pellet returns to substantially ambient conditions, it is removed and examined. The pellet is found to have uniform density, to be resistant to fracture, and have a smooth, glossy surface.

Pellet G is placed in the die and the pressure is brought up to about 6000 p.s.i. Then the induction coil is turned on and the temperature is increased to about 810° C. After about 3 minutes, the induction coil is turned off and the pressure released. After the pellet has substantially returned to ambient temperature, it is removed from the die and examined. The pellet is found to be strong, having uniform density and a glossy, smooth surface.

Pellet H is placed in the die and the pressure is increased to about 6000 p.s.i.g. Then the induction coil is turned on and the temperature increased to about 810° C. After about 7 minutes, the induction coil is turned off and the pressure released. After the pellet has substantially returned to ambient temperature, it is removed from the die and examined. The pellet is found to have uniform density, be resistant to fracture, and have a smooth, glossy surface.

Pellet I is placed in the die. Pressure increase and temperature increase are initiated simultaneously. However, pressure is increased very rapidly to about 6000 p.s.i. while heating is carried on much more slowly so that the temperature reaches about 810° C. well after full pressure has been applied. At the time the pressure reached about 6000 p.s.i.g., the temperature was less than 200° C. After 7 minutes at the full pressure and temperature, the induction coil is turned off and the pressure is released. After the pellet has cooled somewhat, it is removed from the die and examined. The pellet is found to be strong, resistant to fracture and to have a smooth, glossy surface.

Where the preform pellet is heated before pressure is applied (pellet A), a very poor quality pressed pellet results. Similarly, poor results are obtained where the preform pellet (pellets B, C, D and E) have the heating and pressure applying steps conducted simultaneously. However, excellent results are obtained where the preform pellets (pellets F, G and H) have the full pressure applied before heating begins. Also, where the preform pellet (pellet I) has the full pressure applied before significant temperature increase, excellent results are obtained although initial heating began to a slight extent before the full application of pressure. It appears, therefore, that it is necessary for good results that the full pressure be applied before significant plastic flow of the pellet material has occurred.

Although specific components and proportions have been described in the above examples, other suitable materials as indicated above, may be used with similar results. In addition, other materials may be added to the material to be pressed to enhance or otherwise modify the properties of the pellets. For example, the fissionable material may be in the form of nitrides, silicides, carbides as well as oxides.

Other modifications and ramifications of the present invention will occur to those skilled in the art upon reading this disclosure. These are intended to be included within the scope of this invention.

1. A process for preparing nuclear fuel pellets having a density in the range of about 70 to about 95 percent of theoretical density which comprises loading a quantity of a composition selected from the group consisting of oxides of uranium, plutonium and mixtures thereof into a die; applying full pressure in the range of about 6000 to about 10.000 p.s.i.g. before the application of heat to said material sufficient to produce significant plastic flow; then raising the temperature of said material by heating to the range of about 900 to about 1300° C. in a period of about 3 to about 7 minutes while maintaining said full pressure; maintaining said temperature and pressure for from about 3 to about 20 minutes; releasing said pressure; and removing the resulting pellet from the die.

2. The process of claim 1 wherein said nuclear fuel material is initially in the form of an active powder having an oxygen to metal atom ratio greater than stoichiometric and an average particle size of less than 0.1 micron.

3. The process of claim 2 wherein said powder is cold pressed at a pressure of up to about 1000 p.s.i. to produce a self-supporting fragile preform before hot pressing.

4. The process of claim 1 wherein said pressure is from about 6000 to about 10,000 p.s.i. and said temperature is from about 900 to about 1100° C.

5. A process for preparing nuclear fuel pellets having a density in the range of about 70 to about 95 percent of theoretical density which comprises providing a powder comprising a composition selected from the group consisting of the oxides of uranium, plutonium and mixtures thereof as an active powder having an average particle diameter less than about 0.1 micron; cold pressing said powder at a pressure of up to about 1000 p.s.i. to produce a self-supporting fragile preform having a density of about 30 to about 50 percent of theoretical density; placing said preform in a die; applying full pressure in the range of about 6000 to about 10,000 p.s.i. to crush said preform before the application of heat to said crushed preform sufficient to produce plastic flow; then raising the temperature of said crushed preform by heating in said die to a temperature of from about 900 to about 1300° C. in a period of about 3 to about 7 minutes while maintaining said pressure; maintaining said temperature and pressure for from about 3 to about 20 additional minutes; releasing said pressure; and removing the resulting pellet from the die.

6. The process according to claim 5 wherein said powder in said die is heated to a temperature in the range of from about 900 to about 1100° C. after the full pressing pressure has been applied.

7. The process according to claim 5 wherein the full pressing pressure and temperature are maintained for from about 5 to about 12 minutes.

8. The process according to claim 5 wherein the density of the pellets produced is varied within a range of from about 85 to about 95 percent of theoretical density by varying pressing temperature and pressure while maintaining pressing time substantially constant.

9. The process of claim 1 wherein said nuclear fuel material is a mixture comprising uranium dioxide and plutonium dioxide.

10. The process of claim 5 wherein said nuclear fuel material is a mixture comprising uranium dioxide and plutonium dioxide.

References Cited

UNITED STATES PATENTS

| | | | |
|---|---|---|---|
| 3,141,782 | 7/1964 | Livey et al. | 264—0.5 |
| 2,993,786 | 7/1961 | Roboff et al. | 75—208 |
| 3,379,523 | 4/1968 | Chaklaner | 264—0.5 |
| 3,366,576 | 1/1968 | Meyer et al. | 252—301.1 |

CARL D. QUARFORTH, Primary Examiner

R. L. TATE, Assistant Examiner

U.S. Cl. X.R.

252—301.1 R